(12) United States Patent
Hu et al.

(10) Patent No.: US 9,255,621 B2
(45) Date of Patent: Feb. 9, 2016

(54) DAMPER

(71) Applicant: BESTTER (XIAMEN) TECHNOLOGY INC., Fujian (CN)

(72) Inventors: Shengbin Hu, Fujian (CN); Binhua Gong, Xiamen (CN)

(73) Assignee: BESTTER (XIAMEN) TECHNOLOGY INC., Xiamen (CN)

( * ) Notice: Subject to any disclaimer, the term of this patent is extended or adjusted under 35 U.S.C. 154(b) by 0 days.

(21) Appl. No.: 14/258,096

(22) Filed: Apr. 22, 2014

(65) Prior Publication Data

US 2014/0345992 A1 Nov. 27, 2014

(30) Foreign Application Priority Data

May 27, 2013 (CN) .................. 2013 2 0297245 U

(51) Int. Cl.
*F16D 57/02* (2006.01)
*F16F 9/14* (2006.01)

(52) U.S. Cl.
CPC ...................... *F16F 9/145* (2013.01)

(58) Field of Classification Search
CPC .................... F16F 9/145; F16F 9/34
USPC ....................... 188/293, 290; 16/82
See application file for complete search history.

(56) References Cited

U.S. PATENT DOCUMENTS

| | | | | | |
|---|---|---|---|---|---|
| 5,152,189 | A * | 10/1992 | Miura et al. | .................. | 464/180 |
| 5,255,396 | A * | 10/1993 | Miyahara et al. | .............. | 4/246.2 |
| 5,697,122 | A * | 12/1997 | Okabe et al. | .................. | 16/82 |
| 5,720,370 | A * | 2/1998 | Takahashi | .................. | 188/310 |
| 5,768,718 | A * | 6/1998 | Sorimachi | .................. | 4/236 |
| 6,067,667 | A * | 5/2000 | Suzuki | .................. | 4/246.1 |
| 6,213,881 | B1 * | 4/2001 | Sasa et al. | .................. | 464/24 |
| 6,725,984 | B2 * | 4/2004 | Orita | .................. | 188/290 |
| 6,840,355 | B2 * | 1/2005 | Iwashita | .................. | 188/290 |
| 8,167,100 | B2 * | 5/2012 | Chen | .................. | 188/290 |
| 2003/0150678 | A1* | 8/2003 | Iwashita | .................. | 188/296 |
| 2014/0048363 | A1* | 2/2014 | Ozaki et al. | .................. | 188/296 |

FOREIGN PATENT DOCUMENTS

WO  WO 2012141242  A1 * 10/2012

* cited by examiner

*Primary Examiner* — Thomas J Williams
*Assistant Examiner* — Mariano Sy
(74) *Attorney, Agent, or Firm* — Rabin & Berdo, P.C.

(57) ABSTRACT

A damper includes a cavity and a rotation shaft. The rotation shaft is inserted into the cavity of the body in sealing way. An oil cavity is disposed between the cavity and the rotation shaft. The external wall of the rotation shaft is disposed with a pair of protruding ribs axially. Each protruding rib is a groove. One side of the groove is a first retaining wall and the other side is a second retaining wall. A transitional arc is disposed between the side wall of the groove and the top surface of the first retaining wall. A first shape is formed between the other side wall of the groove and the top surface of the second retaining wall. A blade is disposed between the groove of one protruding rib and an internal wall of the cavity, and the blade is movable between the two retaining walls of the groove.

6 Claims, 3 Drawing Sheets

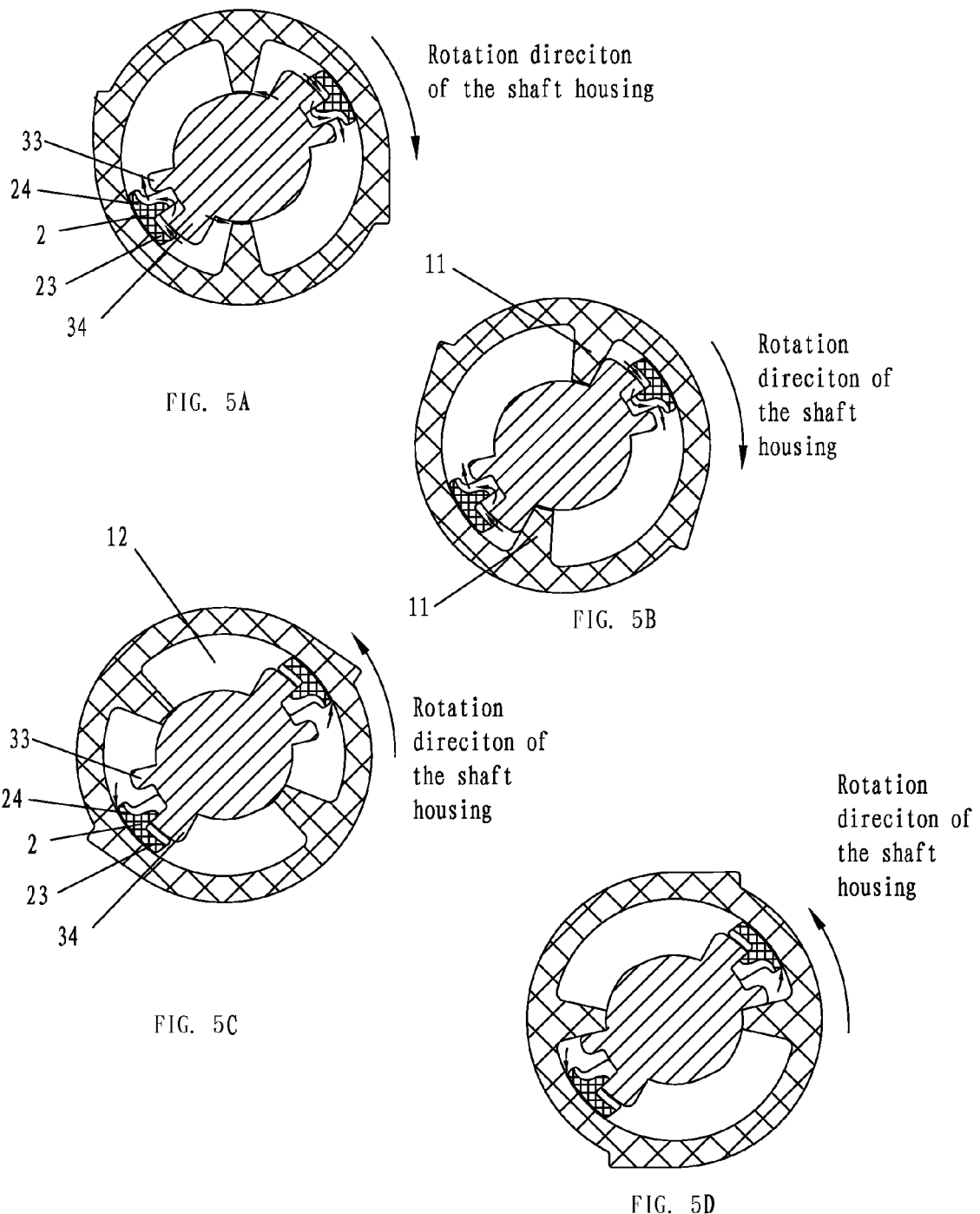

DAMPER

FIELD OF THE INVENTION

The present invention relates to a damper, especially to a damper used in sanitary ware.

BACKGROUND OF THE INVENTION

A water closet has a ceramic body, the body is disposed with a seat ring and a cover. When used, the seat ring and the cover have to be lift up or put down, when the seat ring or the cover is put down, they bump to the body due to the gravity with a loud noise, a damper is assembled to a rotation shaft thereof to slow the seat ring and the cover to drop, thus decreasing the collision strength to the body. Existing has several kinds of dampers, for example in Chinese patent database with patent number CN200920061403.1, disclosed is a damper, a pressing cover is assembled inside the housing to encapsulate the damping oil, a spindle and a valve plate, the internal wall of the housing is disposed coaxially with at least a protruding rib extending to the surface of the spindle, the surface of the spindle is disposed coaxially with at least a block extending to the internal wall of the housing, the protruding rib, the spindle and the block divide the housing into at least two cavities, an accommodating room to set the valve plate is disposed inside the block coaxially, two sides of the accommodating room to set the valve plate are respectively disposed with a first hole and a second hoe, a limit rib is disposed between the first hole and the second hole; the valve plate is limited between the first hole and the limit rib, an oil seal is disposed corresponding to the first hole, and an oil groove/hole is disposed separated from the oil hole to adjust different oil speed, this structure is available of damping, however, the structure is complex, and the torsion of the rotation shaft is weak.

SUMMARY OF THE INVENTION

The object of the present invention is to provide with a damper, which overcomes above problems of existing technology.

The technical proposal of the present invention is as below:

A damper, comprising a rotation shaft, is used to connect to a body disposed in a fixed base or a pivot element, the body is disposed with a cavity with a central axis;

the rotation shaft is inserted into the cavity of the body in sealing way, an oil cavity is disposed between the cavity and the rotation shaft, wherein:

the external wall of the rotation shaft is disposed with a pair of protruding ribs axially, each protruding rib is a groove, one side of the groove is a first retaining wall, the other side of the groove is a second retaining wall; a transitional arc is disposed between the side wall of the groove and the top surface of the first retaining wall, a first shape is formed between the other side wall of the groove and the top surface of the second retaining wall;

two blades are further disposed, each blade is disposed between the groove of one protruding rib and an internal wall of the cavity, and the blade is movable between the two retaining walls of the groove; the cross section of each blade is generally T shaped, the shape of the external side surface is coupled to the internal wall of the cavity; a second shape is formed between a projection in the center of the internal side and the left arm to complement with the first shape and close the oil way, an intersection angle between the projection in the center of an internal side and a right arm is disposed with a transitional arc; a first oil groove is disposed between an internal side and a right side of the projection, a second oil groove is disposed in the right arm correspondingly; an internal side in the center of a left arm is disposed with a third oil groove.

In another preferred embodiment, the cross section of the rotation shaft is a graduated section, that is to say, when the rotation shaft rotates with respect to the cavity in a direction, the distance between the top surface of a protruding rib of the rotation shaft and the internal wall of the cavity gradually increases, when the rotation shaft rotates with respect to the cavity in an opposite direction, the distance between the top surface of a protruding rib of the rotation shaft and the internal wall of the cavity gradually decreases.

In another preferred embodiment, the rotation shaft has two protruding ribs, two protruding ribs are symmetrical about the axis of the rotating shaft.

In another preferred embodiment, the top surface of the first retaining wall is disposed lower than the top surface of the second retaining wall.

In another preferred embodiment, the blade is disposed with two first oil grooves in the internal side and the right side of the projection in the center, two second oil grooves are correspondingly disposed in the right arm.

In another preferred embodiment, the first shape is a right angle type, the second shape is a right angle type.

When using, making the cavity rotating in a direction, the right side of the projection of the blade abuts against the side of the first retaining wall of the rotation shaft near the groove, the hydraulic oil flows from the oil groove of the right arm and the projection in the center, then flows through the clearance between the left side of the projection and the second retaining wall, and finally flows out of the shallow groove between the left arm of the blade and the second retaining wall of the rotation shaft. The oil speed in this direction is high enough.

Then making the cavity rotating in another direction, the left side of the projection of the blade contacts the side of the second retaining wall of the rotation shaft, as no oil groove exists in the left side, the oil way is cut off. Oil flows just through the clearance between the top surface of the blade and the internal wall of the cavity. With the gradual surface of the rotation shaft, the clearance between the retaining rib and the rotation shaft gradually decreases, the oil speed gets more and more slow.

From above mentioned, the present invention is provided with a damper, when lifted up, the oil groove grows larger, the oil speed gets more and more quick, thus making the torsion becoming smaller; when dropping down, the oil speed gets more and more slow, thus making the torsion becoming larger. The present invention of a damper has a simple structure, and the torsion force of the rotation shaft is large enough, and it is easy to manufacture.

BRIEF DESCRIPTION OF THE DRAWINGS

FIG. 5A-5D illustrate the use procedure of the damper of the present invention.

Figure 1:
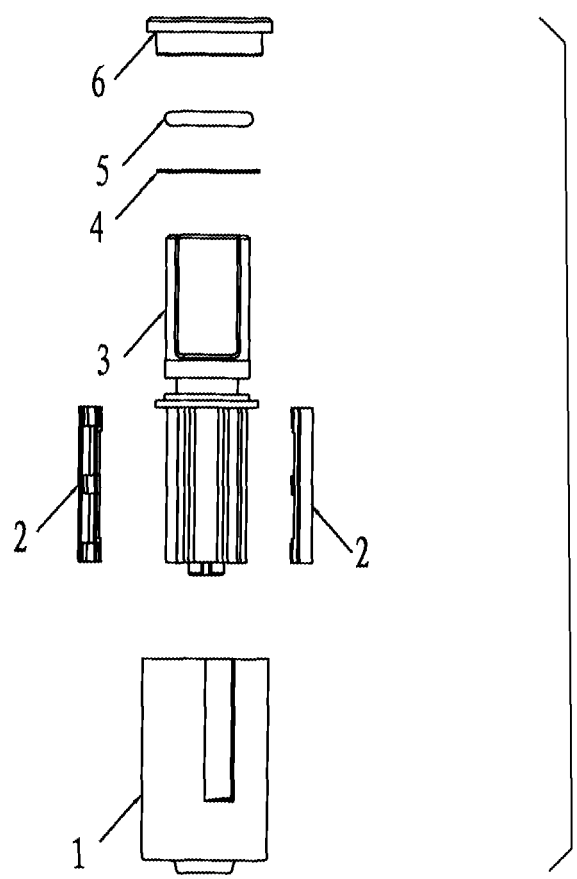
FIG. 1 illustrates an exploded diagram of a damper of the present invention.
Figure 2:
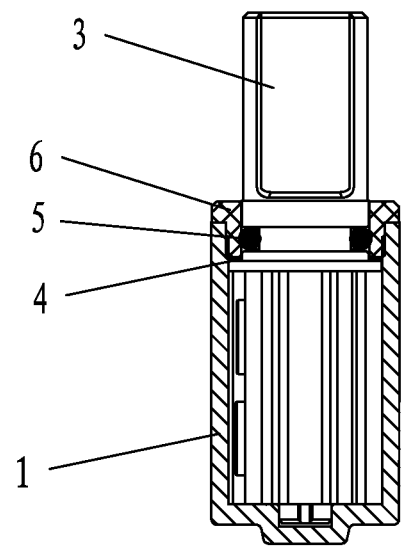
FIG. 2 illustrates a longitudinal-sectional view of the damper of the present invention.

Cavity 1, retaining rib 11, oil cavity 12; blade 2, external side 21, projection 22, left arm 23, right arm 24, first oil groove 25, second oil groove 26, third oil shallow groove 27; rotation shaft 3, protruding rib 31, groove 32, first retaining wall 35, top surface 331, second retaining wall 34, top surface 341; copper spacer 4; O ring 5; lantern ring 6.

DETAILED DESCRIPTION OF THE EMBODIMENTS

An embodiment of the present invention, please refer to FIG. 1 to FIG. 4, is provided with a damper, which comprising a cavity 1, blades 2, a rotation shaft 3, a copper spacer 4, an O ring 5 and a lantern ring 6.

The cavity 1 is a hollow column, one end thereof is closed, while the other end is open, the internal wall of the cavity along the axial direction is disposed with a pair of retaining ribs of symmetrical about the axes. The rotation shaft 3 is disposed inside the cavity 1, the rotation shaft 3 and the open end of the cavity 1 is sealed by the copper spacer 4, the O ring 5 and the lantern ring 6 to prevent the oil from flowing out. An oil cavity 12 is formed between the internal wall of the cavity 1 and the external wall of the rotation shaft.

Figure 4:
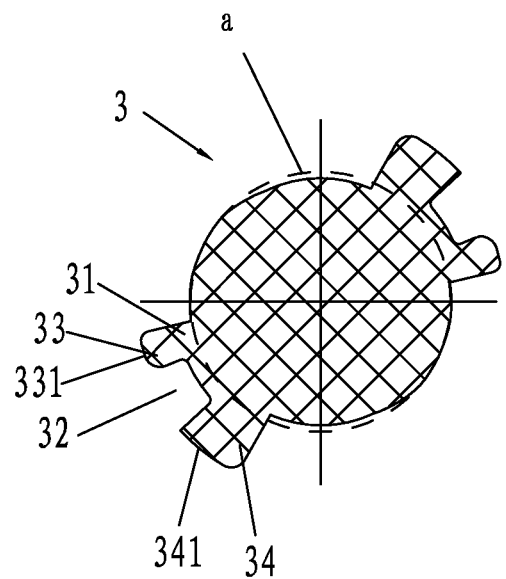
FIG. 4 illustrates a cross-sectional view of the rotation shaft of the present invention.

The external wall of the rotation shaft is disposed coaxially with a pair of protruding ribs 31, this pair of protruding ribs 31 are symmetrical about the axes. A top surface of the protruding rib is a groove 32, thereinto, one side of the groove is a first retaining wall 33, the other side of the groove is a second retaining wall 34, the height of a top surface 331 of the first retaining wall 33 is lower than that of an end face 341 of the second retaining wall 34 (that is to say, the distance of the top surface 331 of the first retaining wall 33 to the axes of the rotation shaft 3 is smaller than the distance of the top surface 341 of the second retaining wall 34 to the axes). Besides, the side wall of the groove 32 and the top surface 331 of the first retaining wall 33 is disposed with a transitional arc, the other side wall of the groove 32 and the top surface 341 of the second retaining wall 34 is disposed with a transitional right angle. The cross section of the rotation shaft is a graduated section. Refer to FIG. 4, the dotted line a is a circle concentric with the rotation shaft, the external side surface of the rotation shaft 3 starts from the first retaining wall 31, and it coincides with the dotted line a at first, then it gradually separates from the dotted line a inwards along the clockwise direction.

Figure 3:
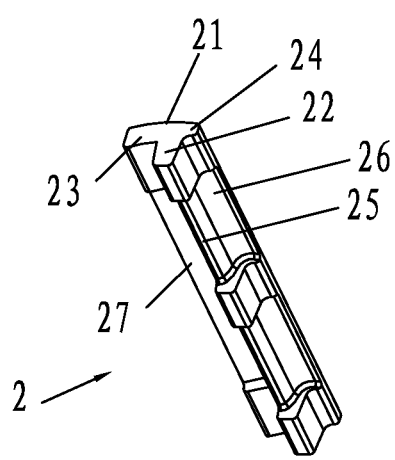
FIG. 3 illustrates a schematic diagram of a blade of the present invention.

Please refer to FIG. 3, the cross section of the blade 2 is generally T shaped, the shape of the external side 21 thereof is coupled to the internal wall of the cavity. The intersection angle of the projection 22 in the center of the internal side and a left arm 23 is right angle type, the intersection angle of the projection 22 in the center of the internal side and a right arm 24 is disposed with a transitional arc. Besides, two first oil grooves 25 are disposed in the internal side of the projection 22 (the front side of FIG. 3) and the right side, two second oil grooves 26 are correspondingly disposed in the left arm 23. Besides, a third shallow oil groove 27 is disposed in the internal side in the center of the left arm 23.

When assembling, refer to FIG. 5A to FIG. 5D, put the left arm of the blade 2 to the second retaining wall 34 of the rotation shaft 3 and the right arm 24 to the first retaining wall 33, as figured in FIG. 5A, when the cavity 1 rotates in clockwise direction, the right side of the projection 22 of the blade 2 abuts against the side of the first retaining wall 33 of the rotation shaft 3 near the groove 32, the intersection angle of the projection in the center of the internal side of the blade and the right arm is disposed with a transitional arc, the side wall of the groove 32 and the top surface 331 of the first retaining wall 33 are disposed with a transitional arc therebetween, therefore, the blade 2 does not contact tightly with the groove, the hydraulic oil flows from the second oil groove 26 to the first oil groove 25, then flows through the clearance between left side of the projection 22 and the second retaining wall 34, finally flows out of the third shallow oil groove 27 between the left arm 23 of the blade and the second retaining wall 34 of the rotation shaft 3. until that the blade 2 is stopped by the second retaining wall 34, as figured in FIG. 5B. therefore, the oil speed in this direction is quick.

As figured in FIG. 5C, when the cavity 1 rotates in anti-clockwise direction, the intersection angle of the projection 22 in the center of the internal side and the left arm is right angle, a side wall corresponding to the groove 32 and the top surface 341 of the second retaining wall 34 is right angle transitional, the left side of the projection 22 of the blade contacts with the side surface of the second retaining wall 34 of the rotation shaft 3, as no oil groove exists in the left side, the oil way is cut off. Oil flows only through the clearance between the top surface 21 of the blade and the internal wall of the cavity 1. With the gradual surface of the rotation shaft, the clearance between the retaining rib 11 and the rotation shaft 3 gradually decreases, the oil speed gets more and more slow.

When the present invention of a damper is lifted up the oil groove grows larger, the oil speed gets more and more quick, thus making the torsion becoming smaller; when dropping down, the oil speed gets more and more slow, thus making the torsion becoming larger.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A damper, comprising
a rotation shaft, used to connect to a body disposed in a fixed base or a pivot element, the body is provided with a cavity with a central axis;
the rotation shaft is inserted into the cavity of the body in sealing way, an oil cavity is disposed between the cavity and the rotation shaft, wherein:
an external wall of the rotation shaft is provided with at least one pair of protruding ribs extending axially, each protruding rib has a groove, one side of the groove is a first retaining wall, the other side of the groove is a second retaining wall;
a transitional arc is disposed between a side wall of the groove and a top surface of the first retaining wall, a first shape is formed between another side wall of the groove and a top surface of the second retaining wall;
two blades are further provided, each blade is disposed between the groove of one protruding rib and an internal wall of the cavity, and the blade is movable between the two retaining walls of the groove;
the cross section of each blade is generally T shaped, and a curvature of an external side surface of the blade conforms to the internal wall of the cavity;
a second shape is formed between a projection in the center of the internal side and a left arm to complement with the first shape and cut off a flow of oil, an intersection angle between the projection in the center of an internal side and a right arm is provided with a transitional arc;
a first oil groove is disposed between an internal side and a right side of the projection, a second oil groove is disposed in the right arm correspondingly; and
an internal side in the center of the left arm is provided with a third oil groove.

2. The damper according to claim 1, wherein the cross section of the rotation shaft is a graduated section, such that
- when the rotation shaft rotates with respect to the cavity in a first direction, the distance between the top surface of a protruding rib of the rotation shaft and the internal wall of the cavity gradually increases, and
- when the rotation shaft rotates with respect to the cavity in an opposite direction, the distance between the top surface of the protruding rib of the rotation shaft and the internal wall of the cavity gradually decreases.

3. The damper according to claim 1, wherein
- the at least one pair of protruding ribs include at least two pairs of protruding ribs, and
- the at least two pairs of protruding ribs are each symmetrical about the axis of the rotation shaft.

4. The damper according to claim 1, wherein the top surface of the first retaining wall is disposed lower than the top surface of the second retaining wall.

5. The damper according to claim 1, wherein
- the blade is provided with two first oil grooves on an internal side and a right side of a projection in the center, and
- two second oil grooves are correspondingly disposed in the right arm.

6. The damper according to claim 1, wherein the first shape is a right angle, the second shape is a right angle.

\* \* \* \* \*